United States Patent [19]

Ishii et al.

[11] Patent Number: 4,725,634

[45] Date of Patent: Feb. 16, 1988

[54] STABILIZER FOR SYNTHETIC RESINS

[75] Inventors: Tamaki Ishii, Suita; Shinichi Yachigo, Toyonaka; Haruki Okamura, Osaka; Yuzo Maegawa, Osaka; Eizo Okino, Kurashiki; Yukoh Takahashi, Toyonaka; Hiroki Yamamoto, Nishinomiya, all of Japan

[73] Assignee: Sumitomo Chemical Company, Ltd., Osaka, Japan

[21] Appl. No.: 852,716

[22] Filed: Apr. 16, 1986

[30] Foreign Application Priority Data

Apr. 17, 1985 [JP] Japan .................. 60-83296

[51] Int. Cl.$^4$ .............................. C08K 5/54
[52] U.S. Cl. .................. 524/103; 252/401; 546/190
[58] Field of Search .......... 524/103; 546/190; 252/401

[56] References Cited

U.S. PATENT DOCUMENTS

| | | | |
|---|---|---|---|
| 3,562,281 | 2/1971 | Werner et al. | 546/190 |
| 4,166,814 | 9/1979 | Karrer | 546/190 |
| 4,348,524 | 9/1982 | Karrer et al. | 524/103 |
| 4,578,454 | 3/1986 | Cantatore | 524/103 |

FOREIGN PATENT DOCUMENTS

| | | | |
|---|---|---|---|
| 124486 | 11/1984 | European Pat. Off. | 546/190 |
| 1241335 | 10/1986 | Japan | 524/103 |

Primary Examiner—Morton Foelak
Assistant Examiner—Kriellion Morgan
Attorney, Agent, or Firm—Wenderoth, Lind & Ponack

[57] ABSTRACT

A stabilizer for synthetic resins containing as an effective ingredient a hindered piperidine compound represented by the general formula:

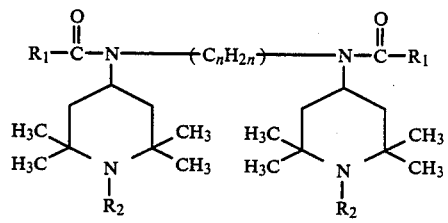

wherein $R_1$ represents a $C_1$–$C_{18}$ alkyl group, $R_2$ represents a hydrogen atom or a $C_1$–$C_4$ alkyl group, n represents an integer of 1 to 12, and $C_nH_{2n}$ represents a straight-chain or branched alkylene group.

3 Claims, No Drawings

STABILIZER FOR SYNTHETIC RESINS

The present invention relates to stabilizers for synthetic resins, particularly stabilizers for synthetic resins effective to prevent the deterioration of the resins by light.

It is well known that synthetic resins such as polyethylene, polypropylene, polyvinyl chloride, polyurethane, ABS resin, etc. deteriorate in quality by the action of light, thereby showing a remarkable reduction in physical properties accompanied by phenomena such as softening, embrittlement, discoloration and the like.

For the purpose of preventing such deterioration by light, it is thus far known to use various kinds of light stabilizers such as 2-hydroxy-4-methoxybenzophenone, 2-hydroxy-4-n-octoxybenzophenone, 2-(2-hydroxy-5-methylphenyl)benzotriazole, 2-(2-hydroxy-3-tert-butyl-5-methylphenyl)-5-chlorobenzotriazole, 2-(2-hydroxy-3,5-dipentylphenyl)benzotriazole, ethyl 2-cyano-3,3-diphenylacrylate, 2,4-di-tert-butylphenyl 3,5-di-tert-butyl-4-hydroxybenzoate, [2,2'-thiobis(4-tert-octylphenolate)]-n-butylamine.nickel(II), Ni salt of bis(3,5-di-tert-butyl-4-hydroxybenzylphosphoric acid)monoethyl ester, bis(2,2,6,6-tetramethyl-4-piperidyl)sebacate and the like. These light stabilizers, however, are not yet quite satisfactory in terms of light fastness.

The present inventors extensively studied to solve these problems, and as a result, found that a particular hindered piperidine compound has an excellent effect in preventing synthetic resins from deterioration by light. The present inventors thus attained the present invention.

According to the present invention, there are provided stabilizers for synthetic resins containing as an effective ingredient a hindered piperidine compound represented by the general formula (I),

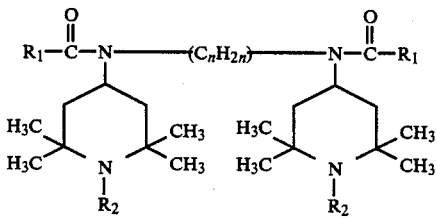
(I)

wherein $R_1$ represents a $C_1$-$C_{18}$ alkyl group, $R_2$ represents a hydrogen atom or a $C_1$-$C_4$ alkyl group, n represents an integer of 1 to 12, and $C_nH_{2n}$ represents a straight-chain or branched alkylene group.

The hindered piperidine compound represented by the general formula (I) can be produced by the common acylation using a compound represented by the general formula (II),

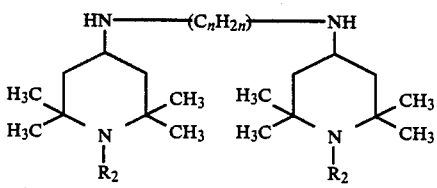
(II)

wherein $R_2$ and n have the same meanings as described above, and a carboxylic acid derivative represented by the general formula (III),

(III)

wherein $R_1$ has the same meaning as described above, and X represents —OH, halogen, —OR$_3$,

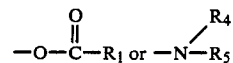

in which $R_3$ represents an alkyl group, and $R_4$ and $R_5$ independently represent a hydrogen atom or an alkyl group.

Typical examples of such hindered piperidine compound are shown in Table 1. Referring to the substituents of the foregoing general formula (I) which are preferred in terms of light fastness, $R_1$ is preferably a $C_1$-$C_{11}$ alkyl group, particularly preferably a $C_1$-$C_4$ alkyl group; $R_2$ is preferably a hydrogen atom or a methyl group, particularly preferably a hydrogen atom; and n is preferably an integer of 3 to 10, particularly preferably an integer of 3 to 6.

TABLE 1

| Compound No. | $R_1$ | $R_2$ | n |
|---|---|---|---|
| I-1 | —CH$_3$ | H | 3 |
| I-2 | —CH$_3$ | H | 6 |
| I-3 | —CH$_3$ | H | 10 |
| I-4 | —CH$_3$ | —CH$_3$ | 6 |
| I-5 | —C$_4$H$_9$ | H | 6 |
| I-6 | —C$_{11}$H$_{23}$ | H | 6 |

When the hindered piperidine compound of the present invention are used, their amount blended with synthetic resins is generally 0.01 to 5 parts by weight, preferably 0.05 to 2 parts by weight based on 100 parts by weight of the synthetic resins. For blending them, the well-known apparatus and methods for incorporating stabilizers, pigments, fillers, etc. in synthetic resins may be used almost as such.

In using the stabilizer for synthetic resins of the present invention, other additives such as antioxidants, light stabilizers, metal deactivators, metal soaps, nucelating agents, lubricants, antistatic agents, flame retardants, pigments, fillers and the like may be used together.

Particularly, the stability of synthetic resins to heat and oxidation can be improved by using a phenolic type antioxidant together. Such antioxidant includes for example 2,6-di-tert-butyl-4-methylphenol, n-octadecyl β-(3,5-di-tert-butyl-4-hydroxyphenyl)propionate, 1,1,3-tris(2-methyl-4-hydroxy-5-tert-butylphenyl)butane, 1,3,5-trimethyl-2,4,6-tris(3,5-di-tert-butyl-4-hydroxybenzyl)benzene, 1,3,5-tris(3,5-di-tert-butyl-4-hydroxybenzyl)isocyanulate, 1,3,5-tris[β-(3,5-di-tert-butyl-4-hydroxyphenyl)propionyloxyethyl]isocyanulate, 1,3,5-tris(2,6-dimethyl-3-hydroxy-4-tert-butylbenzyl)isocyanulate, pentaerythritol tetrakis [β-(3-alkyl-5-tert-butyl-4-hydroxyphenyl)propionate] and the like.

Also, the color of synthetic resins can be improved by using a phosphite type antioxidant together. Such antioxidant includes for example tris(nonylphenyl)phosphite, distearyl pentaerythritol diphosphite, tris(2,4-di-tert-butylphenyl)phosphite, tris(2-tert-butyl-4-methylphenyl)phosphite, bis(2,4-di-tert-butylphenyl)pentaerythritol diphosphite, tetrakis(2,4-di-tert-butylphenyl)-4,4'-bisphenylene diphosphonite and the like.

Also, sulfur-containing antioxidants such as dilauryl thiodipropionate, dimyristyl thiodipropionate, distearyl thiodipropionate, pentaerythritol tetrakis(β-laurylthiopropionate), pentaerythritol tetrakis(β-hexylthiopropionate), 3,9-bis(2-laurylthioethyl)-2,4,8,10-tetraoxaspiro[5.5]undecane and the like may be used together.

Synthetic resins stabilized by the stabilizer for synthetic resins of the present invention includes for example low-density polyethylene, high-density polyethylene, linear low-density polyethylene, chlorinated polyethylene, EVA resin, polypropylene, polyvinyl chloride, methacrylic resin, polystyrene, impact-resistant polystyrene, ABS resin, AES resin, MBS resin, polyethylene terephthalate, polybutylene terephthalate, polyamide, polyimide, polycarbonate, polyacetal, polyurethane, unsaturated polyester resin and the like.

Further, blends of these synthetic resins with rubbers such as isoprene rubber, butadiene rubber, acrylonitrile-butadiene copolymeric rubber, styrene-butadiene copolymeric rubber, ethylene-propylene copolymeric rubber, etc. can also be stabilized by the stabilizer for synthetic resins of the present invention.

The present invention will be illustrated in detail with reference to the following examples, but it is not limited to these examples.

PREPARATION EXAMPLE 1

(Preparation of Compound I-2)

To a 300-ml four-necked flask were added 20.7 g (0.0507 mole) of N,N'-bis(2,2,6,6-tetramethyl-4-piperidyl)-1,6-hexanediamine and 70 g of pyridine, and the former was completely dissolved in the latter. To the resulting solution was added dropwise 11.64 g (0.114 mole) of acetic anhydride over 30 minutes, and stirring was then continued at 40° C. for 1 hour.

After cooling, 100 g of 20% aqueous sodium hydroxide and 50 ml of toluene were added to the reaction solution, and the product was extracted with toluene. The toluene layer was washed with 50 ml of water, and toluene was removed by evaporation. The residue was recrystallized from 20 ml of n-hexane to obtain 21.12 g of N,N'-diacetyl-N,N'-bis(2,2,6,6-tetramethyl-4-piperidyl)-1,6-hexanediamine as a white crystal (m.p., 152°-154° C.).

Yield, 87%

| Elementary analysis (for $C_{28}H_{54}N_4O_2$): | | | |
|---|---|---|---|
| | C(%) | H(%) | N(%) |
| Found | 69.95 | 11.39 | 11.74 |
| Calculated | 70.24 | 11.37 | 11.70 |

EXAMPLE 1

The blend described below was mixed on a mixer for 5 minutes and melt-kneaded at 180° C. on a mixing roll to obtain a compound. This compound was formed into a sheet of 1 mm in thickness on a hot press kept at 210° C., and test pieces of 150×30×1 mm (thick) were prepared therefrom.

The test piece thus obtained was exposed to light in a Sunshine weather meater (light source, carbon arc; temperature of black panel, 83±3° C.; spraying cycle, 120 minutes; and spraying time, 18 minutes) and bent like lobster every 60 hours to obtain a time required for the test piece to break into two. This time was used as a measure for the evaluation of light fastness.

Compounding:

| | Part by weight |
|---|---|
| Unstabilized polypropylene | 100 |
| Calcium stearate | 0.1 |
| 2,6-Di-tert-butyl-4-methylphenol | 0.05 |
| Test compound | 0.15 |

The result is shown in Table 2.

In Table 2, LS-1 to LS-4 express the following compounds:
LS-1  2-(2-Hydroxy-3-tert-butyl-5-methylphenyl)-5-chlorobenzotriazole
LS-2 Bis(2,2,6,6-tetramethyl-4-piperidyl)sebacate
LS-3 4-Benzoyloxy-2,2,6,6-tetramethylpiperidine
LS-4 N,N'-bis(2,2,6,6-tetramethyl-4-piperidyl)-1,6-hexanediamine

TABLE 2

| Example | No. | Light stabilizer | Light fastness (hr) |
|---|---|---|---|
| Present example | 1 | I-1 | 1320 |
| | 2 | I-2 | 1380 |
| | 3 | I-3 | 1200 |
| | 4 | I-4 | 1320 |
| | 5 | I-5 | 1260 |
| | 6 | I-6 | 1140 |
| Comparative example | 7 | LS-1 | 360 |
| | 8 | LS-2 | 960 |
| | 9 | LS-3 | 840 |
| | 10 | LS-4 | 900 |
| | 11 | No addition | 120 |

EXAMPLE 2

The blend described below was extruded at 200° C. into pellets, and the pellets were injection-molded at 230° C. into test pieces of 2 mm in thickness.

The test piece was exposed to light for 1500 hours in a fade meter (light source, ultraviolet carbon arc; and temperature of black panel, 63±3° C.), and the degree of color change was evaluated in terms of a color difference, $\Delta YI$, between the exposed test piece and unexposed one.

The result is shown in Table 3.

Compounding:

| | Part by weight |
|---|---|
| ABS resin | 100 |
| Pentaerythritol tetrakis [3-(3,5-di-tert-butyl-4-hydroxyphenyl)propionate] | 0.05 |
| Distearyl 3,3'-thiodipropionate | 0.2 |
| Test compound | 0.2 |

TABLE 3

| Example | No. | Light stabilizer | $\Delta YI$ |
|---|---|---|---|
| Present example | 1 | I-1 | 12.0 |
| | 2 | I-2 | 11.7 |
| | 3 | I-3 | 12.7 |
| | 4 | I-4 | 11.9 |

TABLE 3-continued

| Example | No. | Light stabilizer | ΔYI |
|---|---|---|---|
| | 5 | I-5 | 12.5 |
| | 6 | I-6 | 13.2 |
| Comparative example | 7 | LS-1 | 29.5 |
| | 8 | LS-2 | 28.6 |
| | 9 | LS-3 | 28.9 |
| | 10 | LS-4 | 39.5 |
| | 11 | No addition | 44.2 |

What is claimed is:

1. A stabilizer for synthetic resins containing as an effective ingredient a hindered piperidine compound represented by the general formula,

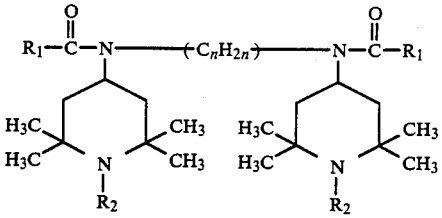

wherein $R_1$ represents a $C_1$–$C_{18}$ alkyl group, $R_2$ represents a hydrogen atom or a $C_1$–$C_4$ alkyl group, n represents an integer of 1 to 12, and $C_nH_{2n}$ represents a straight-chain or branched alkylene group.

2. A stabilizer as claimed in claim 1 wherein $R_1$ is a $C_1$–$C_{11}$ alkyl group, $R_2$ is hydrogen atom or methyl group and n is an integer of 3 to 10.

3. A stabilizer as claimed in claim 1 wherein $R_1$ is a $C_1$–$C_4$ alkyl, $R_2$ is hydrogen atom and n is an integer of 3 to 6.

* * * * *